United States Patent
Chen et al.

(10) Patent No.: US 6,202,677 B1
(45) Date of Patent: Mar. 20, 2001

(54) MULTI-FUNCTIONAL CLEANING AND FILTERING SYSTEM FOR AQUARIUM TANK

(76) Inventors: Chi Chung Chen; Yang Ning Di, both of 8880 Bellaine Blvd., Houston, TX (US) 77036

( * ) Notice: Subject to any disclaimer, the term of this patent is extended or adjusted under 35 U.S.C. 154(b) by 0 days.

(21) Appl. No.: 09/072,511

(22) Filed: May 4, 1998

(51) Int. Cl.[7] .................................................. A01K 63/04
(52) U.S. Cl. ........................ 137/428; 137/391; 210/169; 119/227; 119/232; 119/259
(58) Field of Search .................... 119/232, 224, 119/227, 259, 260, 269; 220/169, 259, 129; 137/430, 428, 391; 210/169

(56) References Cited

U.S. PATENT DOCUMENTS

| | | | |
|---|---|---|---|
| 3,734,853 | * | 5/1973 | Horvath ................................ 210/169 |
| 4,483,368 | * | 11/1984 | Panthofer ........................ 137/614.04 |
| 4,610,784 | * | 9/1986 | Reyniers ............................... 210/169 |
| 4,817,561 | * | 4/1989 | Byrne et al. ......................... 210/169 |
| 4,861,468 | * | 8/1989 | Willinger et al. .................... 210/169 |
| 4,957,623 | * | 9/1990 | Henzlik ................................ 210/169 |
| 5,002,660 | * | 3/1991 | Sherman et al. ..................... 210/169 |
| 5,090,443 | * | 2/1992 | Jacobsen .............................. 137/429 |
| 5,097,795 | * | 3/1992 | Adey ........................................ 119/3 |
| 5,098,585 | * | 3/1992 | Woltman et al. .................... 210/169 |
| 5,240,596 | * | 8/1993 | Chesnut ................................ 210/136 |
| 5,277,800 | * | 1/1994 | Dieckmann et al. ................ 210/169 |
| 5,279,730 | * | 1/1994 | Chen .................................... 210/169 |
| 5,282,961 | * | 2/1994 | Ellis et al. ........................... 210/169 |
| 5,433,843 | * | 7/1995 | Calabrese ............................. 119/259 |
| 5,730,861 | * | 3/1998 | Sterghos et al. ................. 210/169 X |
| 5,755,961 | * | 5/1998 | Limcaco ............................... 210/259 |
| 5,779,884 | * | 7/1998 | Raymo ............................. 210/169 X |
| 5,881,753 | * | 3/1999 | Bowling ........................... 210/169 X |
| 5,942,105 | * | 8/1999 | Leis ...................................... 210/129 |
| 6,017,461 | * | 1/2000 | Garvey et al. .................. 210/169 X |

\* cited by examiner

Primary Examiner—John Rivell
(74) Attorney, Agent, or Firm—Thomason, Moser & Patterson (57) ABSTRACT

A cleaning and filtering apparatus and method for a tank such as an aquarium. The major components are an inlet water controller, a suction unit, and a filter container unit. The filter container is selectively connected to the suction unit and a waste outlet to clean the tank and discharge waste water from the tank. The inlet water controller comprises a float connected to a valve to automatically replace the discharged water when the water level in the tank drops.

19 Claims, 13 Drawing Sheets

MULTI-FUNCTIONAL CLEANING AND FILTERING SYSTEM FOR AQUARIUM TANK

BACKGROUND OF THE INVENTION

1. Field of the Invention

The present invention relates to aquariums, more particularly to apparatus and methods for maintaining fresh water in aquariums.

2. Background of the Related Art

Most aquarium tank filtering systems that are available in the market today would just circulate the water inside the tank and filter the dirt. But in fact there are still a lot of dirt and solid wastes accumulated at the comers and other hidden areas that are hard to reach and cannot be cleansed easily. Also a lot of microorganisms like algae grows on the inside surface of the tank and produce hazardous biological wastes that are usually located under rocks. These facts will always make the water quality deteriorate and harmful to the healthiness of the aquarium fish.

Another disadvantage of the ordinary tank filters is that it is very time-consuming and requires human handling intensively to change and clean the aquarium. Also, when adding large amounts of fresh water, heating the water frequently cracks the water warmer due to the sudden change in water temperature. Therefore, changing and cleaning the water increase the mortality rate of aquarium fish. Our objective is to provide a system that can minimize the temperature difference due to water change and at the same time minimize the disturbance to the aquarium fish.

SUMMARY OF THE INVENTION

The present invention provides a cleaning and filtering apparatus and method for a tank such as an aquarium. The major components are an inlet water controller, a suction unit, and a filter container unit. The filter container is selectively connected to the suction unit and a wastewater hose to clean the tank and discharge waste water from the tank. The inlet water controller comprises a float connected to a valve to automatically replace the discharged water when the water level in the tank drops.

BRIEF DESCRIPTION OF THE DRAWINGS

The invention is illustrated by preferred embodiments of the components as shown in the drawings.

DETAILED DESCRIPTION OF A PREFERRED EMBODIMENT

The present invention provides components for an aquarium that automatically replenishes the water at a slow rate. The major components are an inlet water controller 10, suction unit 20, and filter container unit 30. When the major parts are working together, it provides an automatic, convenient and efficient cleaning and filtering system that will reduce the mortality rate of the Aquarium fish after water change. Our objective is to provide a system and equipment that can minimize the temperature difference due to water change and at the same time minimize the disturbance to the aquarium fish.

Figure 1:
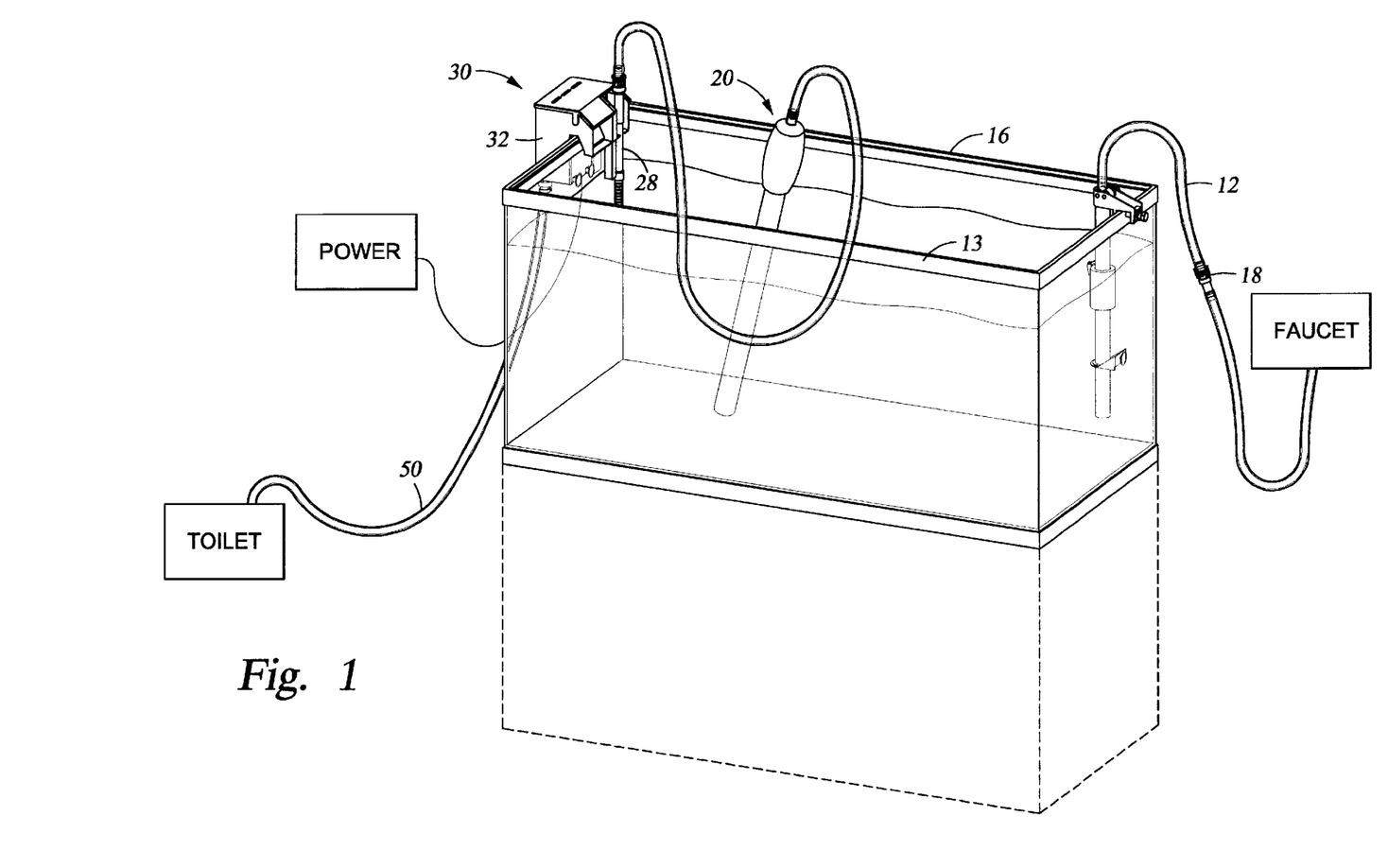
FIG. 1 is a perspective view of an aquarium having a preferred inlet water controller, suction unit, and filter container unit of the present invention.
Figures 2, 3:
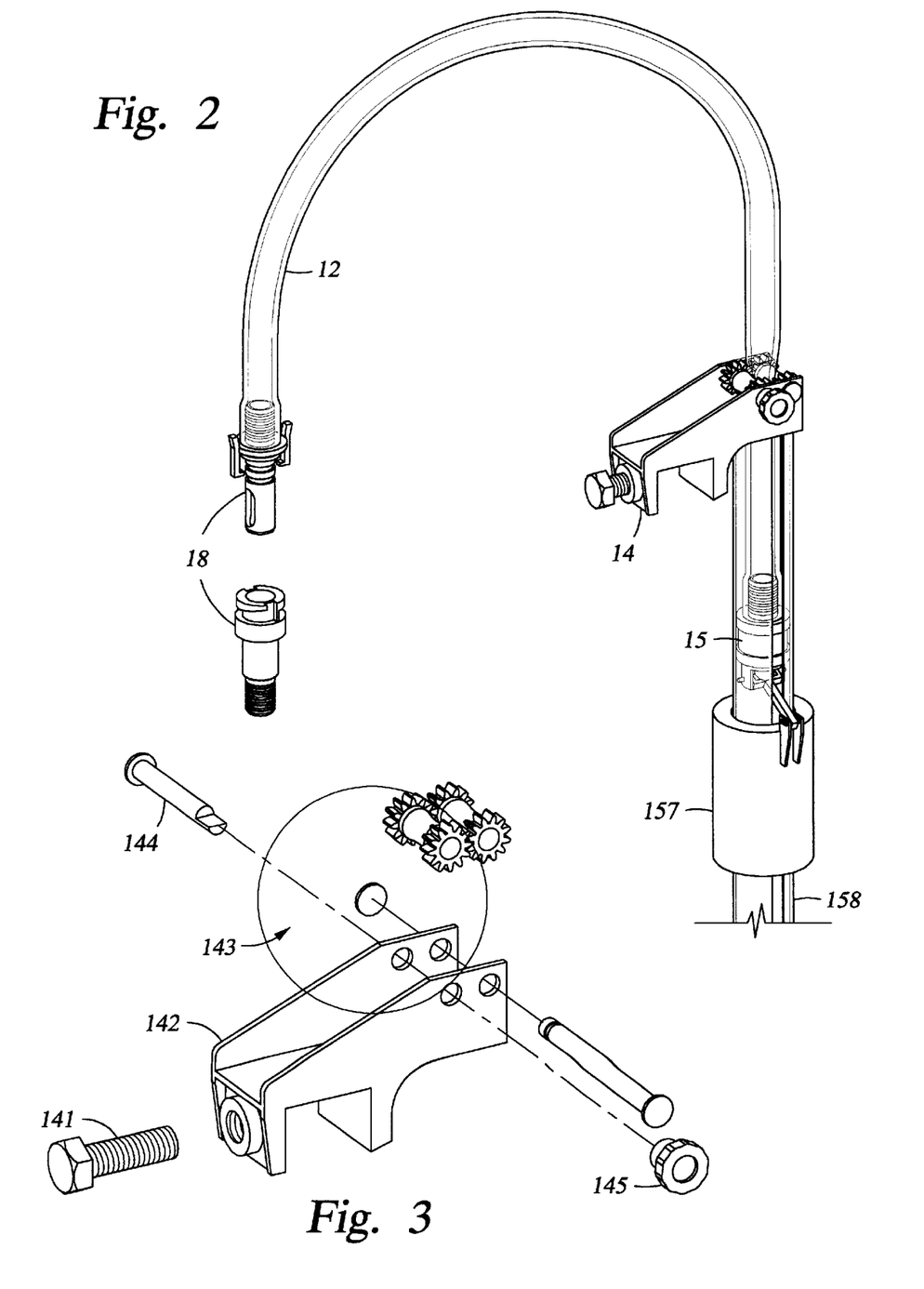
FIG. 2 is a perspective view of the inlet water controller of FIG. 1.
FIG. 3 is an assembly view of a component of the inlet water controller of FIG. 2.

Referring to FIGS. 1–2, the major function of inlet water-controller 10 is to control the water level inside the tank 16. When the suction unit 20 is sucking out the water and dirt deposits through a wastewater hose 50, the water level inside the tank will decrease. When the water level drops to a predetermined level the inlet water controller 10 will then let fresh water enter the tank. This technique lets in fresh water gradually to avoid sudden change of water temperature and to avoid making the water cloudy. Usually, about ⅕ of the water in the tank 16 should be changed. Therefore, the inlet water controller 10 provides a convenient and safe method to change the water.

The inlet water controller 10 consists of the following components, a convertible connector water hose 12, a mounting bracket 14 for the tank frame 13, and a water controller 15. The convertible connector water hose 12 has a connector 18 to connect the inlet water controller 10 to a water supply outlet. The water hose 12 transports fresh water from the water supply to the inlet water controller 10 and provides support for the inlet water controller 10 when the water hose is filled up with water.

The tank frame 13 attaches the inlet water controller 10 to the water tank 16 and serves as a supporting frame for the components. Mounting bracket 14 connects inlet water controller 10 to the fish tank frame 13 firmly in place. The advantage of this design is that it allows the position of the inlet water controller 10 to be adjustable.

Referring to FIG. 3, the mounting bracket 14 comprises a mounting bolt 141, a bracket body 142, and adjusting gears 143, which can be rotated by an adjust knob 145. A gear shaft 144 is turned by an adjust knob 145 to move the water hose 12 up and down, and is manually adjusted to determine the desired water level to be filled in the fish tank.

Figure 4:
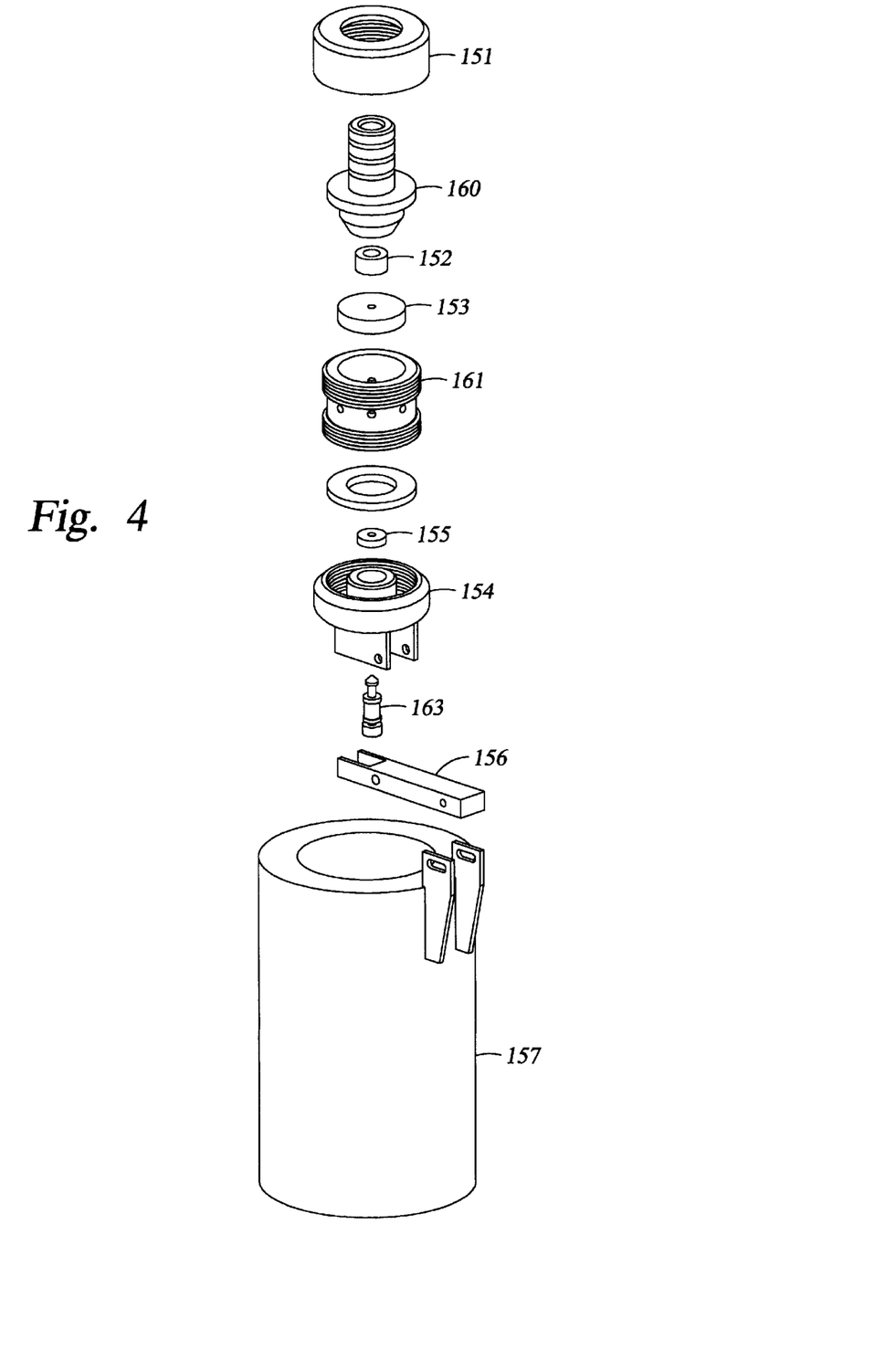
FIG. 4 is an assembly view of a valve in the inlet water controller of FIG. 2.

Referring to FIG. 4, the inlet water controller 10 is subdivided into a top housing 151 which secures a hose connector 160, a current restrictor 152, an active seal 153, a lower housing 154, a seal cylinder 161, a rubber seal 155, a lever rod 156, a float 157, an actuator 163, and a guide pipe 158. Top housing 151 is connected to the water hose 12 and has threads at bottom to thread tight with the seal cylinder 161 which has threads to engage the lower housing 154.

The current restrictor 152 is inside the top housing 151 closed with an active seal 153. A mall-hole on the active-seal 153 of the current restrictor 152 can control the opening and losing position of the inlet water controller and restrict and control water level. The active seal 153 is exactly like the valve to control the opening and closing position. When it is pushed upwards, it will close the outlet of the inlet water controller 10, When it is pushed downwards, it will let the water come in though the passage. Lower housing 154 has threads to connect to the seal cylinder 161. The rubber-seal 155 inside the lower housing 154 closes the outlet of the inlet water control when a float 157 raises upward to move a lever rod 156.

The lever rod 156 has two bumps on one side to clip on the lower housing 154 and the float 157. The float 157 has a pair of holes to connect to lever rod 156, and the float 157 is hollow in center just the size to let the guide pipe 158 to go though, which can transfer the energy straight up and use the float 157 as a mechanical switch. The embodiment uses the water pressure energy as the switch. When fish tank water level dropped down, the weight of the float 157 can press down the active seal 153 which is on the bottom of lower housing 154, then it will let the fresh water flow into the tank.

Figure 5:
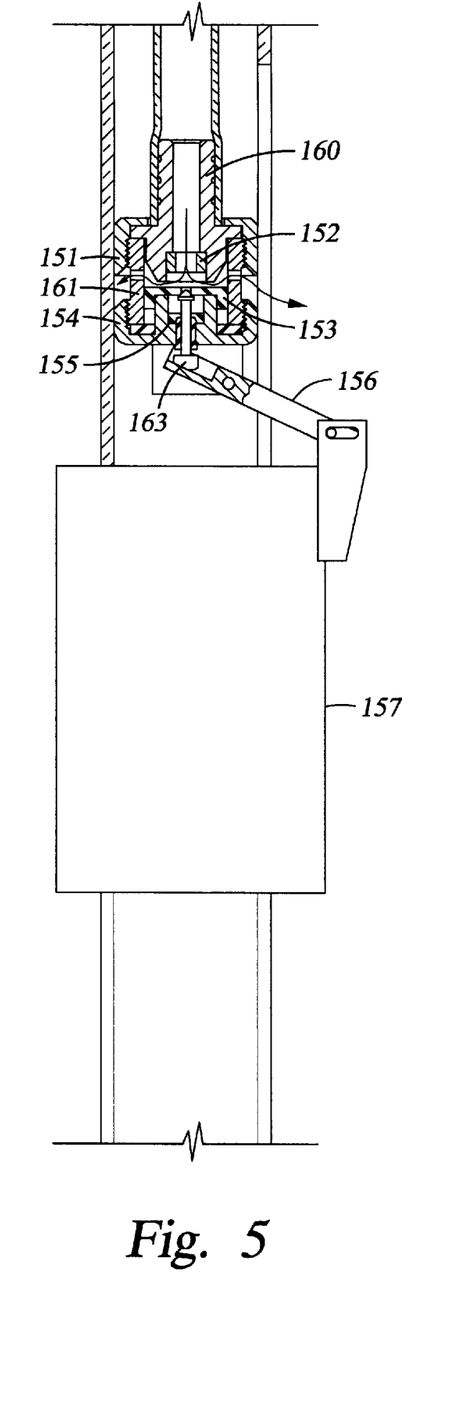
FIG. 5 is a side view showing the inlet water controller in an open position.

The inlet water controller 10 is shown in the open position in FIG. 5. The fresh water from the water hose 12 goes through the current restrictor 152, and out to the fish tank 16 through holes on the side of the seal cylinder 161.

Figure 6:
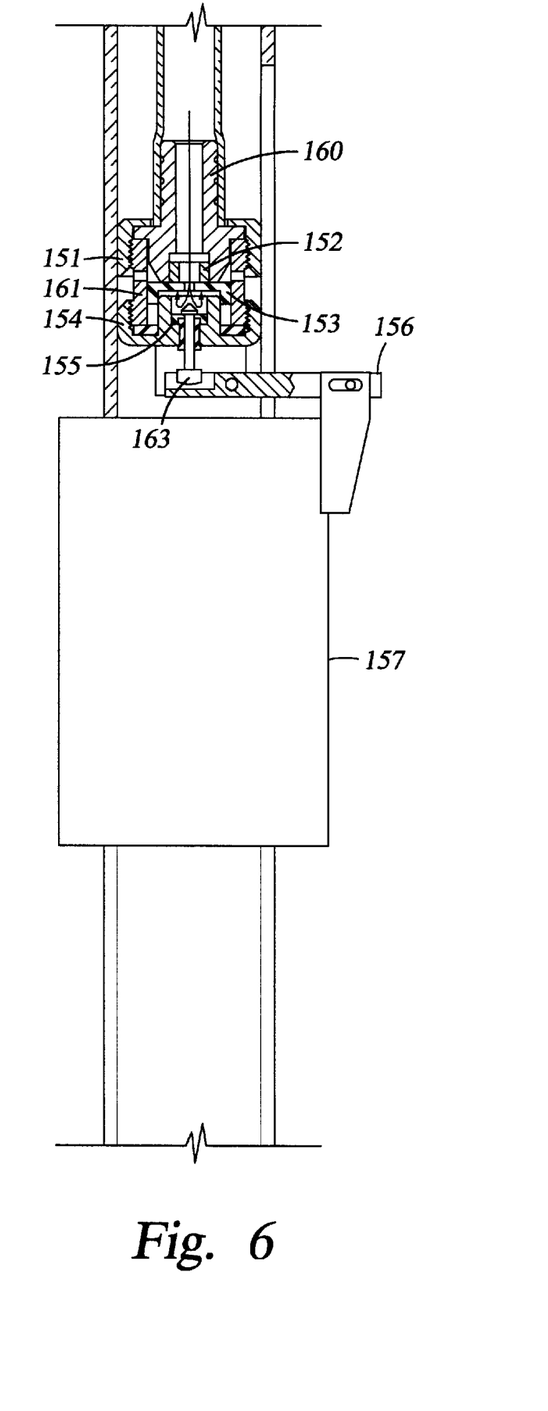
FIG. 6 is a side view showing the inlet water controller in a closed position.

The inlet water controller 10 is shown in a "closed position in FIG. 6. When the water in the fish tank 16 is up to the predetermined level it pushes the float 157 up and the lever rod 156 closes the actuator 163.

A characteristic of our new design is that it would only open at specific range of water pressure and will close when the water pressure is outside this range. This can prevent water from overflowing. Also, it has a cylindrical shape, this can prevent hurting the fish when they impact with the device.

Figure 7:
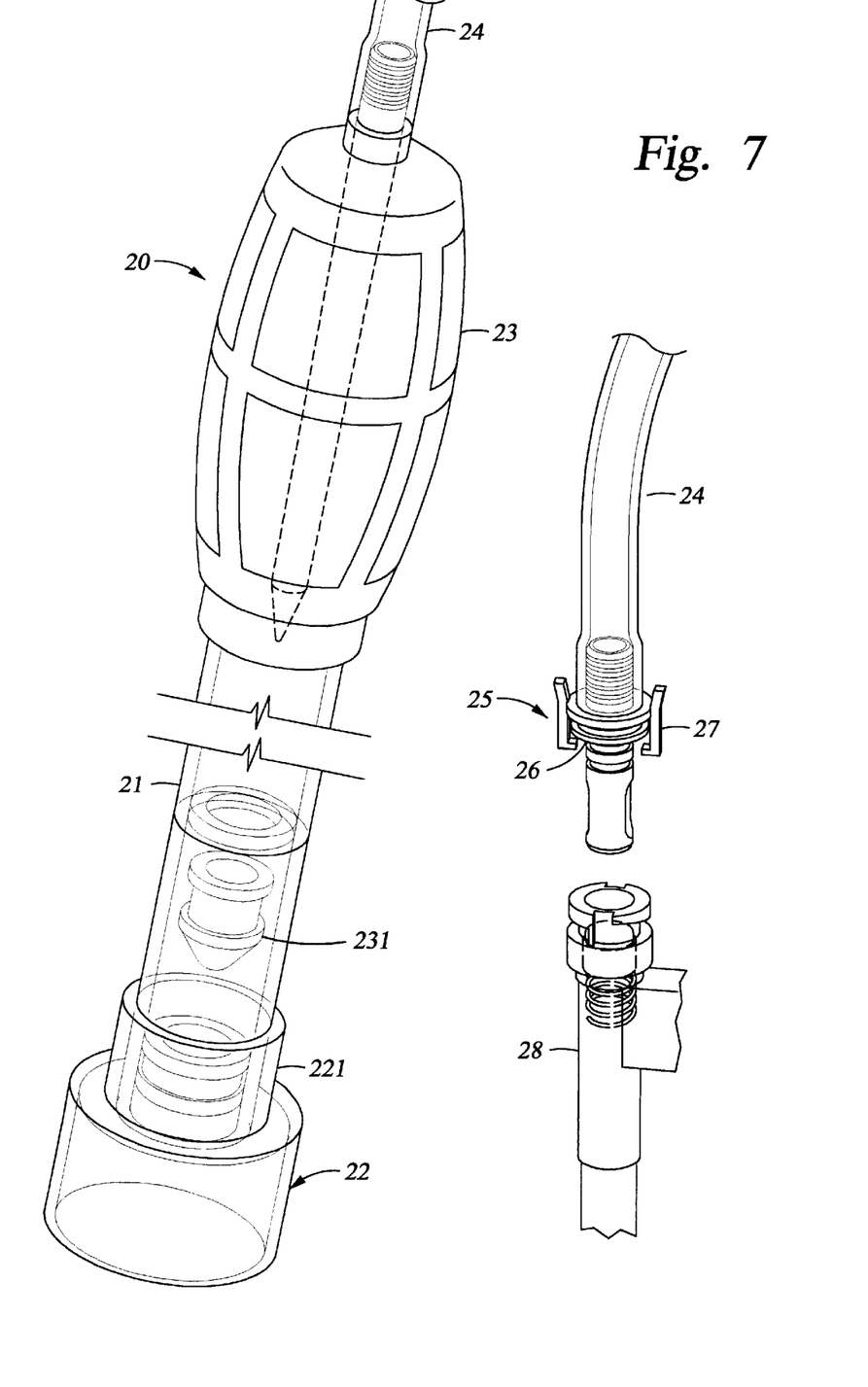
FIG. 7 is a view of the suction unit of FIG. 1.
Figure 8:
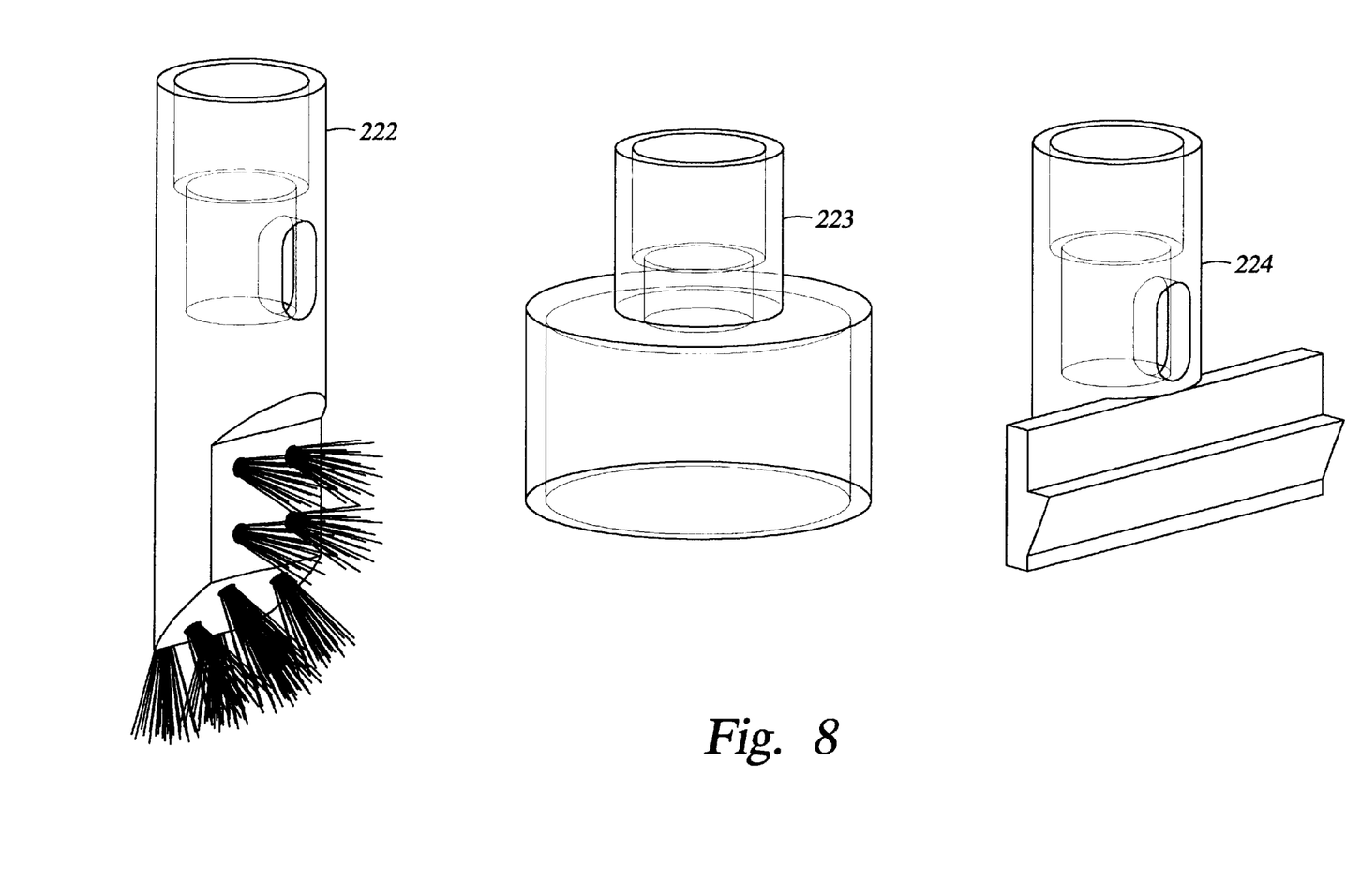
FIG. 8 is a view of accessories for the suction unit of FIG. 1.
Figure 9:
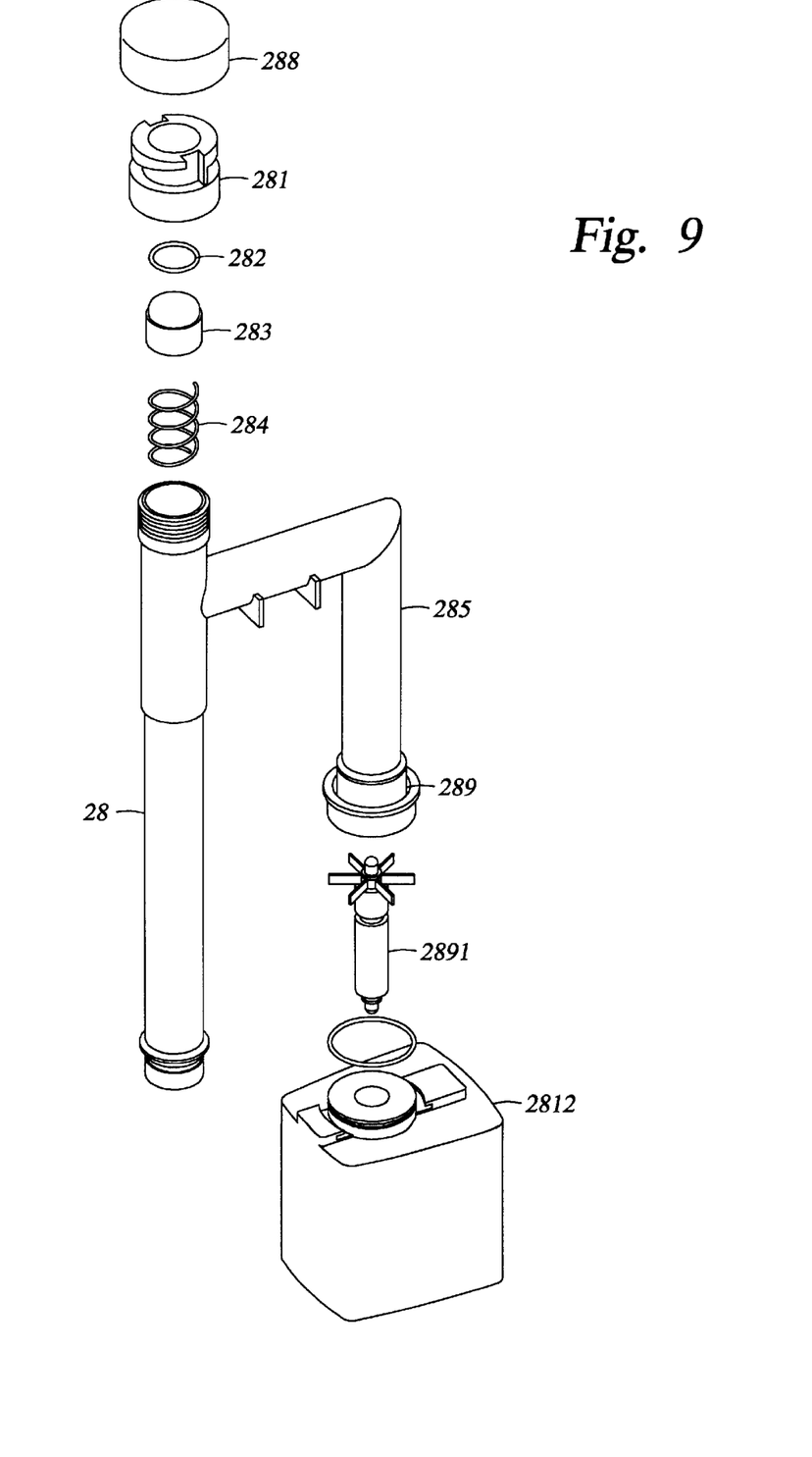
FIG. 9 is a side view of a filter container tube in the filter container unit of FIG. 1.
Figure 10:
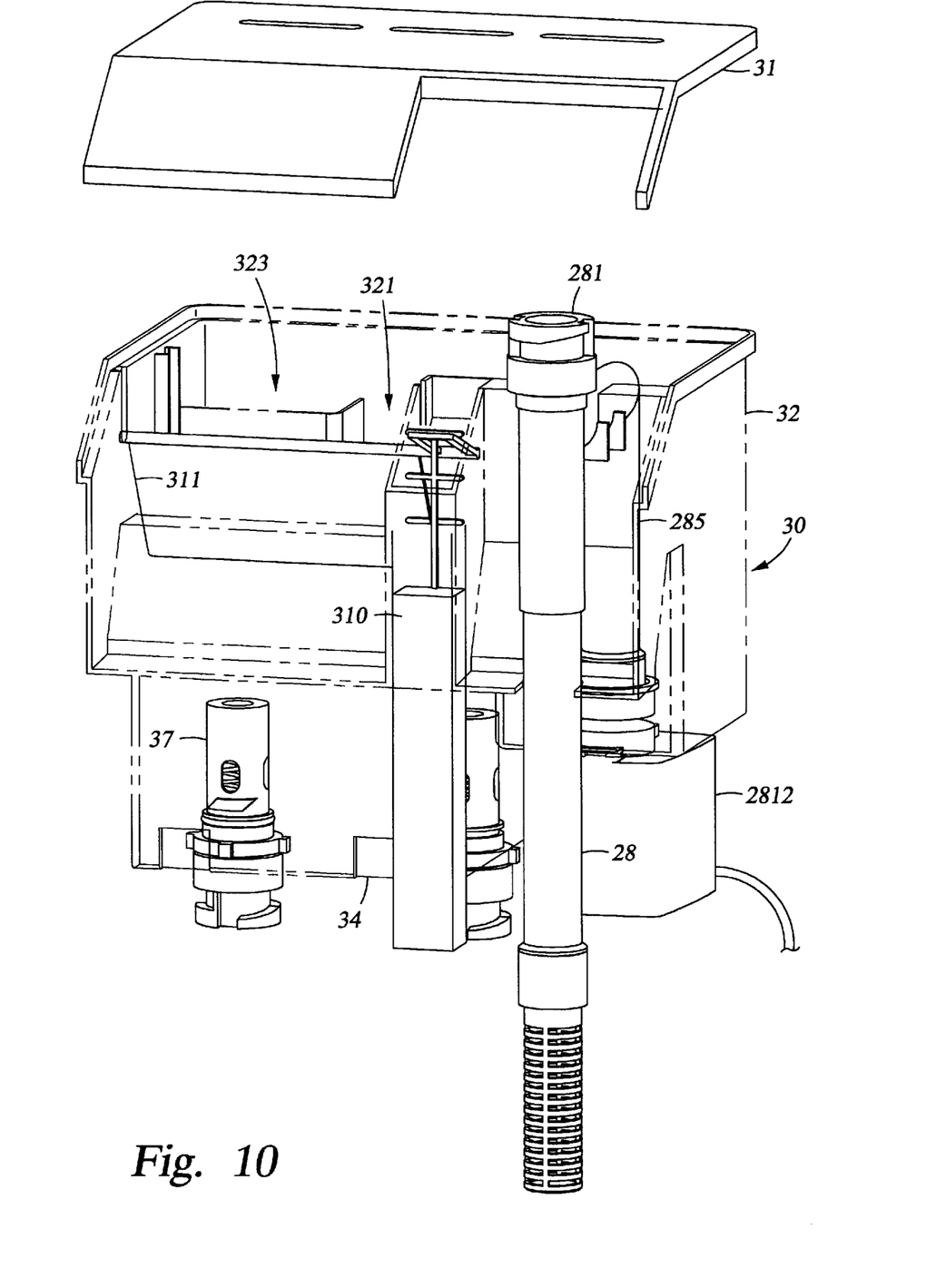
FIG. 10 is an assembly view of the filter container unit.
Figure 11:
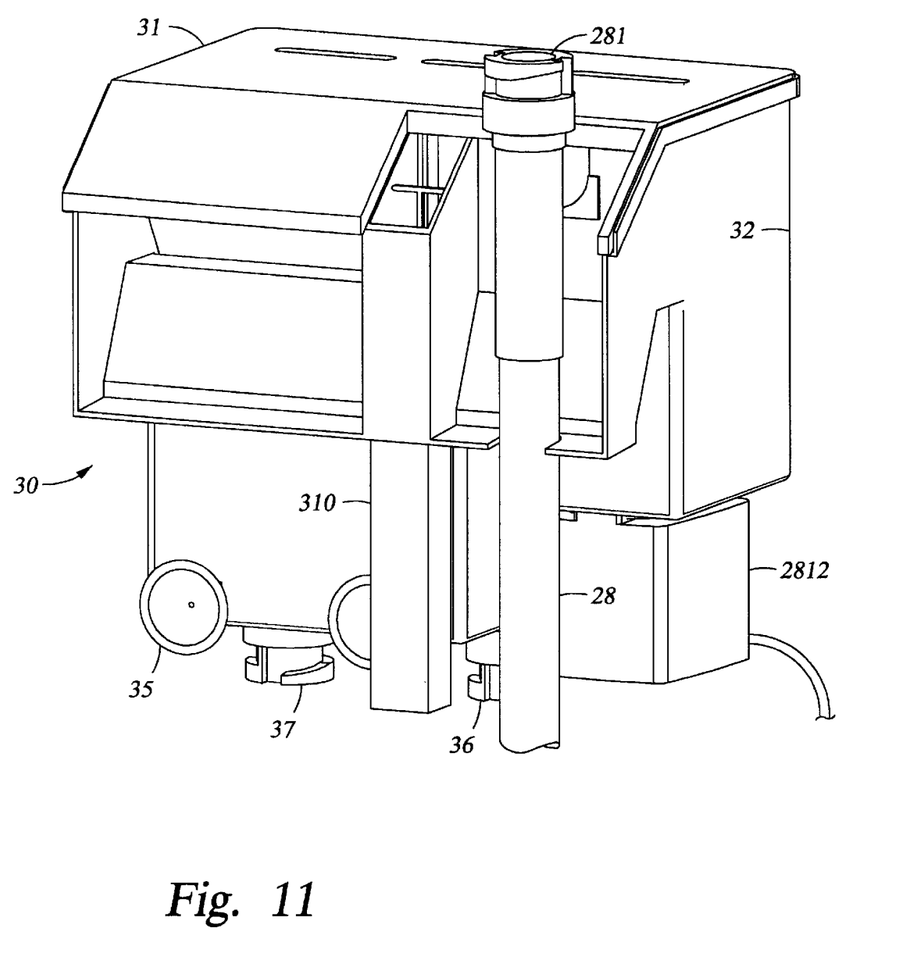
FIG. 11 is a perspective view of the filter container unit.
Figure 12:
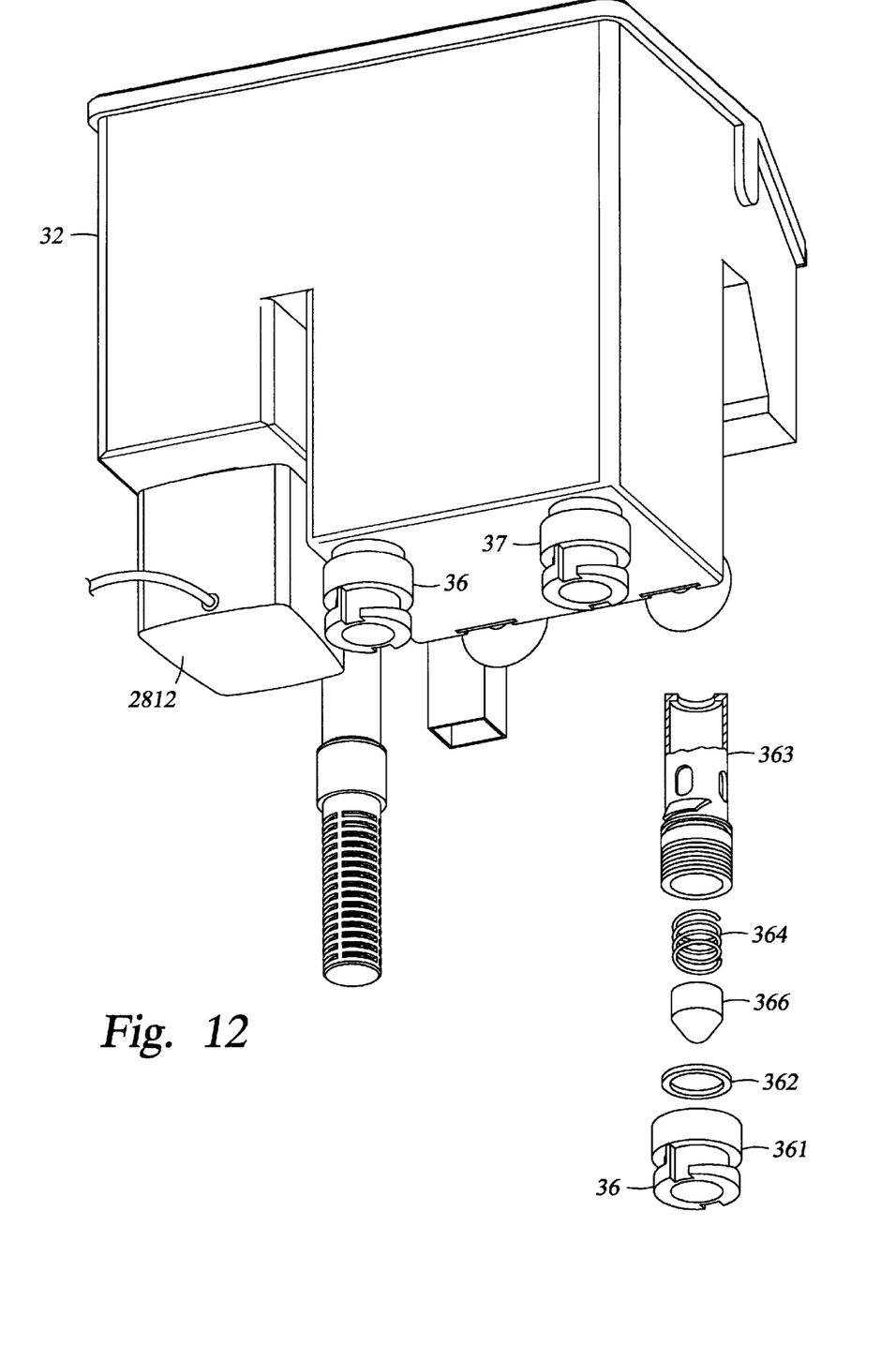
FIG. 12 is a perspective view of the back of the filter container unit.
Figure 13:
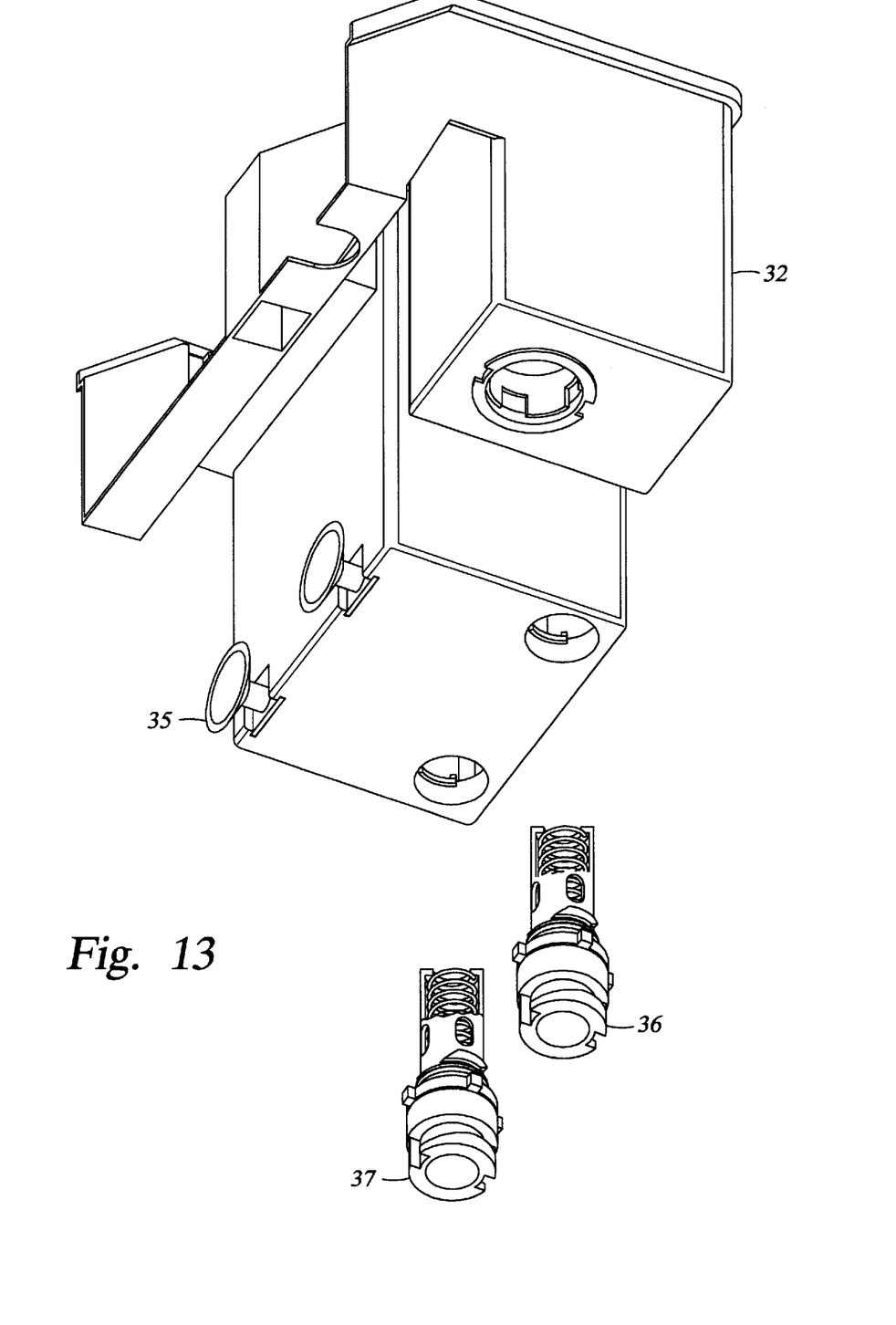
FIG. 13 is a bottom view of the filter container unit.
Figure 14:
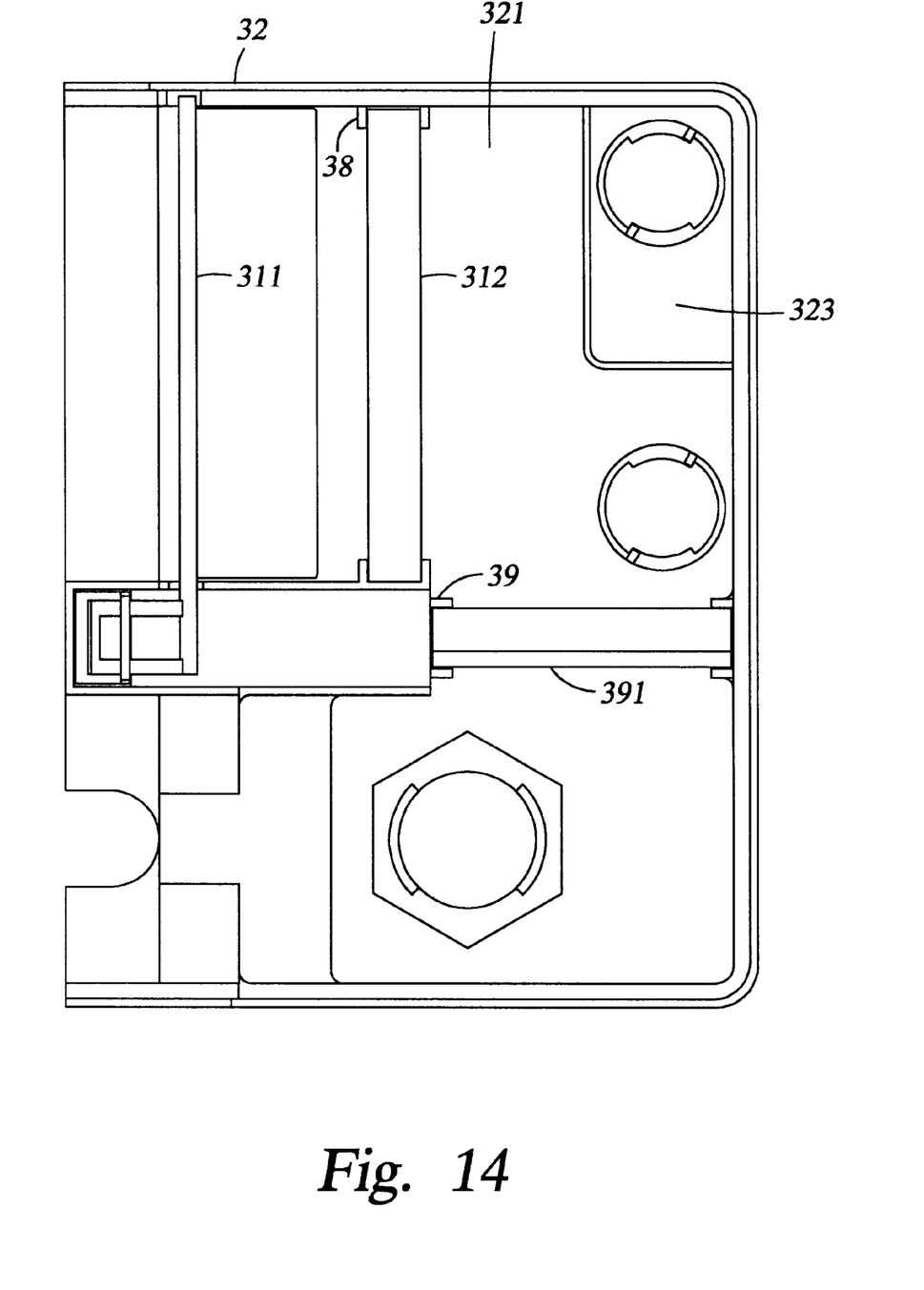
FIG. 14 shows a top view of the filter container unit.
Figure 15:
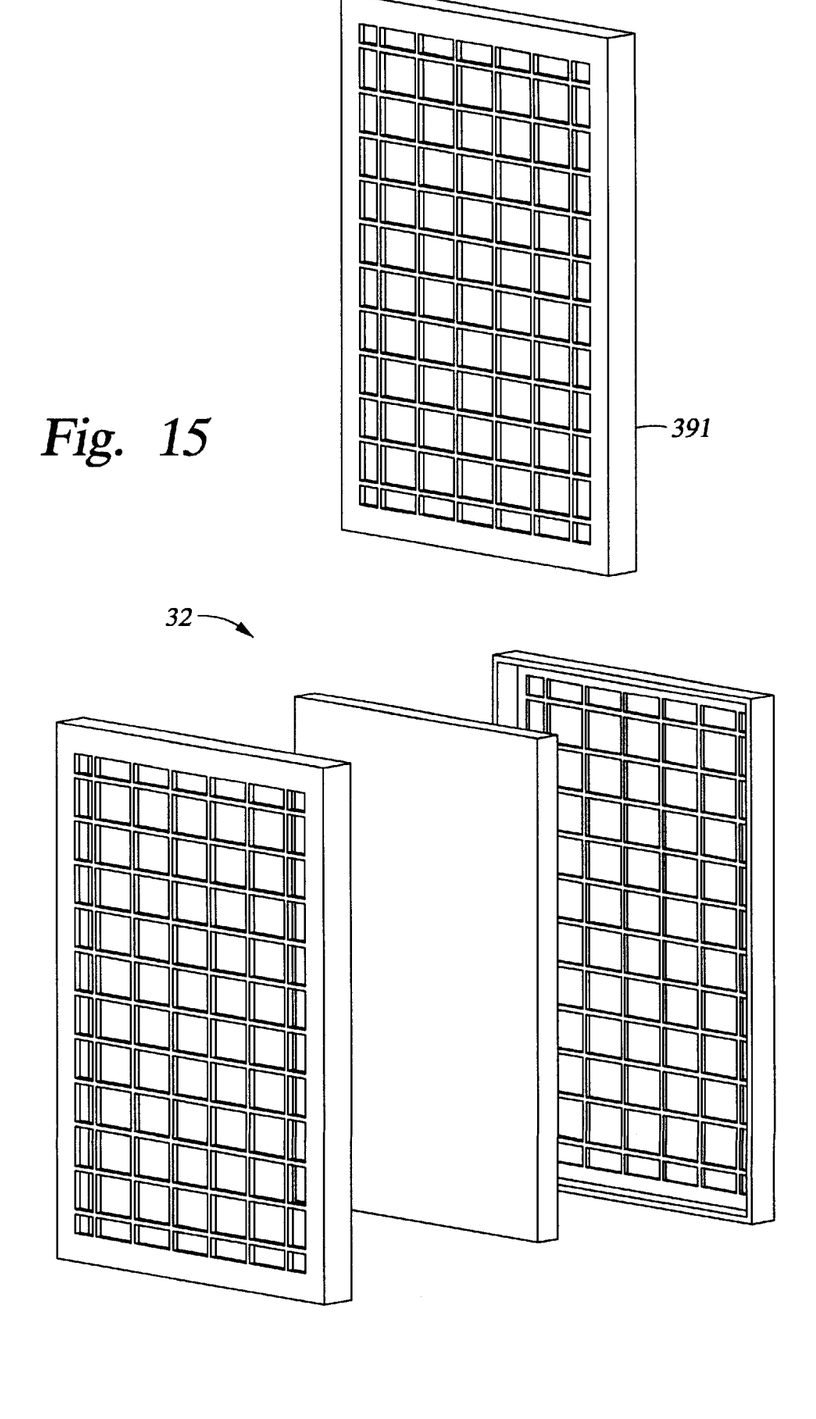
FIG. 15 shows components in the filter container unit.

Referring to FIGS. 7–8, the suction unit 20, which connects to the filter container unit 30 (FIG. 1), is an integral part of the filtering system and can clean out any areas and corners in the fish tank 16. The structure and components of the suction unit 20 comprise a tube 21, a suction accessory 22 (such as a brush 222, a cylinder 223, or a scraper 224), a rubber pump 23, a plastic water hose 24, a connector 25, a seal 26, connector lockers 27, and a filter container tube 28. The top of the suction accessory 22 has a rubber ring 221 to receive the tube 21 and seal tight the two components. The connector locker 27, along with the connector 25, press and turn to plug in to the filter container tube 28.

The suction accessory 22 can also prevent sand and small rock from going into the filter container unit 30. The top of the suction accessory 22 has a one way valve 231 that connects to the rubber pump 23. When the rubber pump 23 is being squeezed, water will go though this valve 231 in only one direction into the filter container unit 30.

Referring to FIGS. 9–15, the filter container unit 30 comprises the filter container tube 28 and a filter container 32. The filter container tube 28 contains a valve housing top 281, which has threads that lock to the top of the filter container tube 28. The valve housing top 281 has one side pressed to an active seal 283. Another side of the valve housing top 281 has a groove that can turn to tighten connection to the connector locker 27 of the suction unit 20 (see, FIG. 7). A rubber cover 288 protects the valve housing top 281.

A rubber ring 282 is provided to tighten connection of the valve housing top 281 to the active seal 283 and prevent air from going inside. The active seal 283 controls the direction of water, since the active seal become an obstruction that blocks water from the suction unit 20. A spring 284 holds the active seal 283 to obstruct the suction unit 20 until displaced by insertion of the connector 25 into the valve housing top 281.

A tube 285 extends from the filter container unit 30 to receive water from the filter container tube 28. A propeller housing 289 provides the room to accommodate a propeller 2891. Rubber rings 2811 close the gaps between a pump 2812 and the filter container unit 30 also prevents any unnecessary air from entering the unit. The propeller housing 289 and a magnetcoil pump 2812 combine to form an electrical pump which can be used underwater. The pump 2812 is a 110 volt electrical device. The filter container unit 30 is the most important part in maintaining a clean environment in the aquarium tank since its major function is to filter and circulate water.

The filter container 32 contains filter container cover 31 which has a row of holes on it to allow water vapor to escape. The filter container 32 can also be divided into three chambers. The main chamber 321 provides the room needed for the water to go though and is the place to insert the water filter 312. The suction chamber 322 fills up with water so that excessive air is eliminated and allows the water to pass though. The flood chamber 323 prevents any damage caused by overflowing and flooding of water when inlet water controller 10 is not functioning properly.

The filter container 32 has a bench trap 34 which provides a place for the insertion of suction cups 35. The suction cups 35 do not directly attach to the filter container 32 to prevent breaking the filter container.

A wastewater release valve 36 consists of the connector-housing 361, having internal grooves and seals 362 to connect without leaking, a valve top 363 holding a piston 366 shaped like a circular cone and a spring 364. When the wasterwater hose 50 is connected to the water release valve 36, the piston 366 rises from the seal 362 to create a space to let wastewater pass though.

An overflow release valve 37 has the same structure as the wastewater release valve 36. A wastewater filter trap 38 is provided to hold the water filter 312. A charcoal box trap 39 it disposed between main chamber 321 and suction chamber 322 to hold a charcoal box 391.

The filter container unit 30 includes a float 310. Raising of the float 310 indicates the inlet water controller 10 is malfunctioning and providing excessive water flow into the fish tank causing the water level to push up the float. When float 310 goes up, it will cause the flood gate 311 to come down and close. Excessive water would then flow out through the overflow release valve 37. Floodgate 311 works with the float 310 to control the water level, preventing an overflow.

There are three working modes with this system.

(1) Changing Water Mode:

When the suction unit 20 and wastewater hose 50 are connected to the filter container unit 30, this becomes the changing water mode. Due to water and air pressure, the dirt and solid waste will be sucked up from the suction unit 20 to the filter container 32 at this time; the dirt and waste will then pass though the waste-water release valve 36 to the outlet.

(2) Water Dilution Mode:

When the water in the tank has been let out about ⅕ of the original level, the inlet water controller 10 starts to work. On one hand, it lets dirty water to go out, and on the other hand, it continuously lets on fresh water into the tank back to the original level. Therefore the water is being continuously supplied.

(3) Water Circulation Mode:

In this mode, the apparatus works like any other ordinary filter system. The waste water release valve 36 is closed, and only the main chamber 321 continuously circulates the tank water into the filter and goes though water filter to the tank, to achieve the filtering purpose. This can maintain the cleanliness of the water quality.

The characteristic of the new design is that the water circulation passage from one mode to another changes by connecting or disconnecting the suction unit 20 and the wastewater hose 50.

The present invention is described by reference to components that form an integrated system to provide multiple functionality for cleaning and filtering water. The invention is not limited to the components described herein.

What is claimed is:

1. A multifunctional cleaning and filtering apparatus for an aquarium tank, comprising;

an inlet water controller disposed in the aquarium tank; and a filter container selectively connected to a waste outlet and a suction unit disposed in the aquarium tank.

2. The apparatus of claim 1, wherein the filter container is connected to the waste outlet when the suction unit is connected to the filter unit.

3. The apparatus of claim 1, wherein the suction unit and the waste outlet are selectively connected to the filter container by first and second valves.

4. The apparatus of claim 1, wherein the inlet water controller has a float connected to a valve.

5. The apparatus of claim 1, wherein the filter container comprises a flood gate connected to a float.

6. The apparatus of claim 5, wherein the filter container further comprises a flood chamber.

7. The apparatus of claim 1, wherein the suction unit comprises a rubber pump.

8. The apparatus of claim 1, wherein the filter container and the inlet water controller are mounted on a tank frame.

9. A multifunctional cleaning and filtering apparatus, comprising:

a tank frame;

an inlet water controller mounted on the tank frame and having a first float connected to a valve;

a filter container mounted on the tank frame and selectively connected to a waste outlet and a suction unit located within the tank frame, wherein the filter container comprises a flood gate connected to a second float.

10. The apparatus of claim 9, wherein the filter container is connected to the waste outlet when the suction unit is connected to the filter container.

11. The apparatus of claim 10, wherein the suction unit and the waste outlet are selectively connected to the filter container by second and third valves.

12. The apparatus of claim 9, wherein the filter container comprises a flood chamber.

13. The apparatus of claim 9, wherein the suction unit comprises a rubber pump.

14. A method for cleaning and filtering water in an aquarium tank, comprising:

circulating the water through a filter container having a first valve in a closed position and a second valve in a closed position;

connecting the filter container to a suction unit to open the first valve and connecting the filter container to a waste outlet to open the second valve; and discharging water from the aquarium tank while the filter container is connected to the waste outlet and the suction unit.

15. The method of claim 14, wherein about 1/5th of the water is removed each time the first and seconds valves are opened.

16. The method of claim 14, further comprising supplying water from an inlet water controller having a float connected to a second valve while discharging water from the aquarium tank.

17. The method of claim 14, wherein the filter container comprises a flood gate connected to a float.

18. The method of claim 17, wherein the filter container comprises a flood chamber.

19. The apparatus of claim 14, wherein the suction unit comprises a rubber pump.

\* \* \* \* \*